(12) United States Patent  
Maeda

(10) Patent No.: US 6,340,848 B1
(45) Date of Patent: Jan. 22, 2002

(54) ON-VEHICLE DISTRIBUTION BOX AND DISTRIBUTION SYSTEM

(75) Inventor: Yuji Maeda, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/537,433

(22) Filed: Mar. 27, 2000

(30) Foreign Application Priority Data

May 12, 1999 (JP) ............................................ 11-130981

(51) Int. Cl.[7] .............................. B60L 1/00; H02J 1/10
(52) U.S. Cl. ........................................ 307/10.1; 307/24
(58) Field of Search ................................. 307/9.1, 10.1, 307/11, 18–20, 24, 28, 29, 31, 33, 34, 38, 39

(56) References Cited

U.S. PATENT DOCUMENTS 5,184,058 A * 2/1993 Hesse et al. .................... 320/4
5,973,409 A * 10/1999 Neibecker et al. ......... 307/10.1
6,166,934 A * 12/2000 Kajouke et al. .............. 363/65

FOREIGN PATENT DOCUMENTS

JP 5-155296 6/1993
JP 9-169217 6/1997

* cited by examiner

Primary Examiner—Matthew Nguyen
(74) Attorney, Agent, or Firm—Armstrong, Westerman, Hattori, McLeland & Naughton, LLP

(57) ABSTRACT

An on-vehicle distribution box for distributing an electrical power supplied from a power source to a first voltage load operated on a first voltage and to a second voltage load operated on a second voltage differed from the first voltage. The distribution box includes a primary circuit of which an upstream point is connected to the power source and of which a downstream point is connected to the first load. The primary circuit has also a first fuse means. The distribution box also includes a branch circuit branched at an upstream point of the fuse means from the primary circuit and connected to the second load at a downstream side of the branch circuit. A DC/DC converter is provided in the branch circuit for converting the first voltage to the second voltage, and a second fuse means is provided in the branch circuit downstream from the DC/DC converter. The first voltage is higher than the second voltage. There may be provided a main distribution box and a secondary distribution box, and an upstream side of the secondary distribution box is connected to a downstream side of the primary box.

4 Claims, 2 Drawing Sheets

ON-VEHICLE DISTRIBUTION BOX AND DISTRIBUTION SYSTEM

BACKGROUND OF THE INVENTION

1. Field of the Invention

The present invention relates to an on-vehicle distribution box and a distribution system utilizing the distribution box for distributing an electrical power to a first load operated on a first voltage and to a second load operated on a second voltage differed from the first voltage.

2. Related Art

An automobile vehicle has a battery supplying an electrical power to an engine starting system including a cell motor and an ignitor and to other systems including in-cabin indication meters and electrical equipment Generally, the battery is 12 V in ordinal passenger cars and 24 V in larger-size vehicles like a truck and a bus.

However, some loads of the vehicles may not operate efficiently on such voltages and may require a power having a voltage higher than 12 V (volts) or 24 V (volts).

To fulfill such requirement, there has been proposed an automobile power source circuit disclosed in Japanese Patent Application Laid-open No. H. 5-155296. The circuit can apply 24 V voltage by connecting two 12 V batteries in series at a starting condition and can apply 12 V voltage by using the two 12 V batteries in parallel during a normal operation of the automobile.

However, the above-mentioned automobile circuit has not sufficiently satisfied the need of providing a higher voltage even during a normal operating condition to loads other than the starting system.

Furthermore, as another proposal, Japanese Patent Application Laid-open No. 9-169217 discloses a DC/DC converter unit, in which a high voltage circuit connected to a high voltage battery is branched at a position downstream from a main fuse. The branch circuit is connected to a converter via a secondary fuse to convert the high voltage into a lower voltage for supplying an electrical power to low-voltage loads like lighting equipment.

Nevertheless, the above-mentioned DC/DC converter unit provides a higher voltage circuit in all the upstream side of the DC/DC converter, so that the secondary fuse must has the same high voltage constitution as the main fuse, causing an increased cost of the fuse. Furthermore, the secondary fuse for the high voltage is not satisfactory for protecting low-voltage equipment arranged downstream from the converter in the event of an excessive current, which may cause a damage in the low-voltage equipment.

In view of the above-described circumstances, an object of the invention is to provide an on-vehicle distribution box and an on-vehicle distribution system which efficiently provide a power source having both a first voltage suitable for relatively higher voltage loads and a second voltage suitable for relatively lower voltage loads, surely preventing the damage of the loads in the event of an overcurrent.

For achieving the object, first and second aspects of the present invention relate to an on-vehicle distribution box, and a third aspect of the present invention relates to an on-vehicle distribution system.

The first aspect is an on-vehicle distribution box for distributing an electrical power supplied from a power source to a first voltage load operated on a first voltage and a second voltage load operated on a second voltage differed from the first voltage. The distribution box includes:

a primary circuit of which an upstream point is connected to the power source and of which a downstream point is connected to the first load, a first fuse means provided in the primary circuit, a branch circuit branched upstream from the first fuse means from the primary circuit and connected to the second load at a downstream point of the branch circuit, a DC/DC converter arranged in the branch circuit for converting the first voltage to the second voltage, and a second fuse means arranged in the branch circuit downstream from the DC/DC converter.

The second aspect is the distribution box described in the aspect 1, wherein the first voltage is higher than the second voltage.

The third aspect is an on-vehicle distribution system comprising a main distribution box and a secondary distribution box each of which has the constitution of the distribution box described in the aspect 1 or 2, wherein an upstream point of the secondary distribution box is electrically connected to a downstream point of the primarily distribution box.

Next, operational effects and advantages of the present invention will be discussed.

In the first aspect, the distribution box has the second fuse means provided between the second load and the DC/DC converter in the branch circuit. The second fuse means may have a shutdown character adequately set for the second voltage operating the second load.

Thus, with no restriction imposed by the electrical load condition of the vehicle, the first and second voltages different from each other are supplied efficiently respectively to each first or second voltage load, surely preventing a damage of the first and second loads in the event of an overcurrent.

In the second aspect, the distribution box provides a high voltage circuit for supplying an electrical power directly supplied from the battery to the first load before converting it by the DC/DC converter.

Thus, the maximized amount of the high-voltage circuit of the vehicle reduces a transmission loss of the electrical power.

The third aspect provides an on-vehicle distribution system having the secondary distribution box connected to a downstream point of the main distribution box and constituted basically in the same way as the main distribution box. The main and secondary distribution boxes have the primary and branch circuits for distributing the electrical power to the first and second loads, which provides a decentralized power supply system.

The first and second voltage loads each are connected to a downstream side of the primary circuit or the branch circuit of the main or secondary distribution box. Particularly, each of the second voltage loads operated on the second voltage differing from the battery voltage receives an electrical power through one of the DC/DC converters. That is, the voltage conversion is distributively carried out by the DC/DC converters of the distribution boxes. Thus, a heat radiation generated during the voltage conversion is divided for the DC/DC converters to prevent a centerized large amount of heat radiation, thereby eliminating an additional structure for heat radiation or for cooling. This reduces the DC/DC converters in size, allowing an easy installation of them in the distribution boxes. As a result, the distribution boxes are also decreased in dimension, which is advantageous when mounted in the vehicle.

Moreover, in an accidental event of one of the second voltage loads, which is arranged downstream from one of the DC/DC convector, an electrical power supplied to the second voltage load may be shut off by stopping the operation of the related distribution box without interrupting all the electrical power supply.

DETAILED DESCRIPTION OF THE PREFERRED EMBODIMENT

Next, Referring to the accompanied drawings, an embodiment of an on-vehicle distribution box will be discussed together with an associated embodiment of an on-vehicle distribution system according to the present invention.

Figure 1:
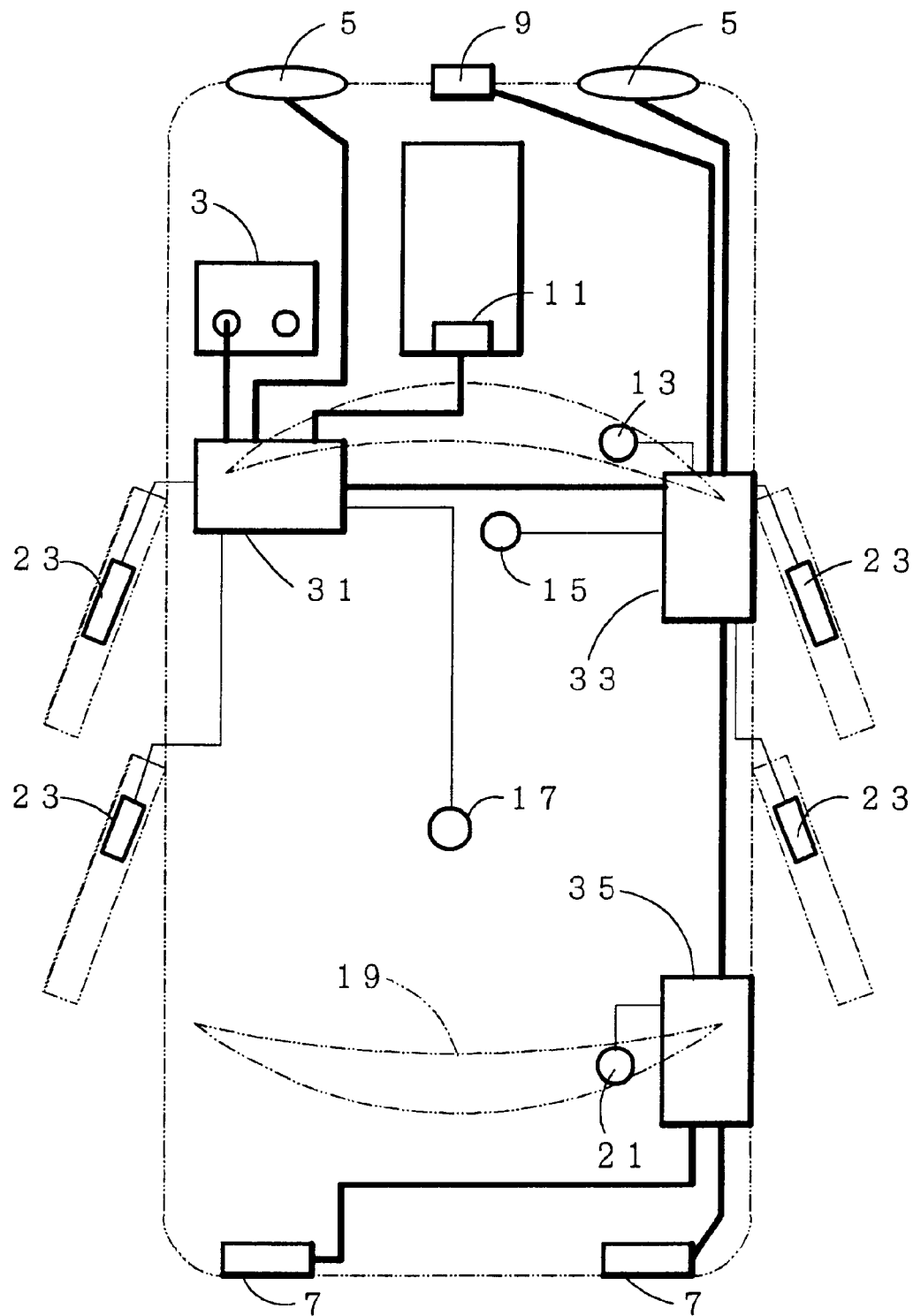
FIG. 1 is a diagram showing a general configuration of an electrical system utilizing an on-vehicle distribution box of an embodiment of the present invention.

FIG. 1 is a diagram showing a general configuration of an electrical system utilizing an on-vehicle distribution box of an embodiment of the present invention.

Denoted 1 is a vehicle body having a high-voltage battery 3 (corresponding to a power source described in the invention summary) of 42 V (called as the battery hereinafter). Electrical equipment operated on a power of the battery includes an ignitor 11, a wiper motor 13, a hot-wire defogger 21 for a rear window 19, a window motor 23 for a door trim (not shown), which are loads each requiring a larger rated capacity of 42 V (corresponding to a first voltage described in the invention summary), and includes ordinal loads each requiring a normal capacity of 14 V (corresponding to a second voltage described in the invention summary) such as a head lamp 5, a tail lamp 7, a horn 9, meters/accessories 15 installed on a dashboard (not shown), and a room lamp 17.

An electric power supplied from the battery 3 is delivered to a first distribution box 31 disposed near an assistant seat which is at a position nearest from the battery 3, to a second distribution box 33 disposed near a driver seat, and to a third distribution box 35 disposed near a rear seat positioned just behind the driver seat. The electrical power is distributed to large or normal capacity loads each generally through the nearest one of the distribution boxes, 31, 33, and 35.

Figure 2:
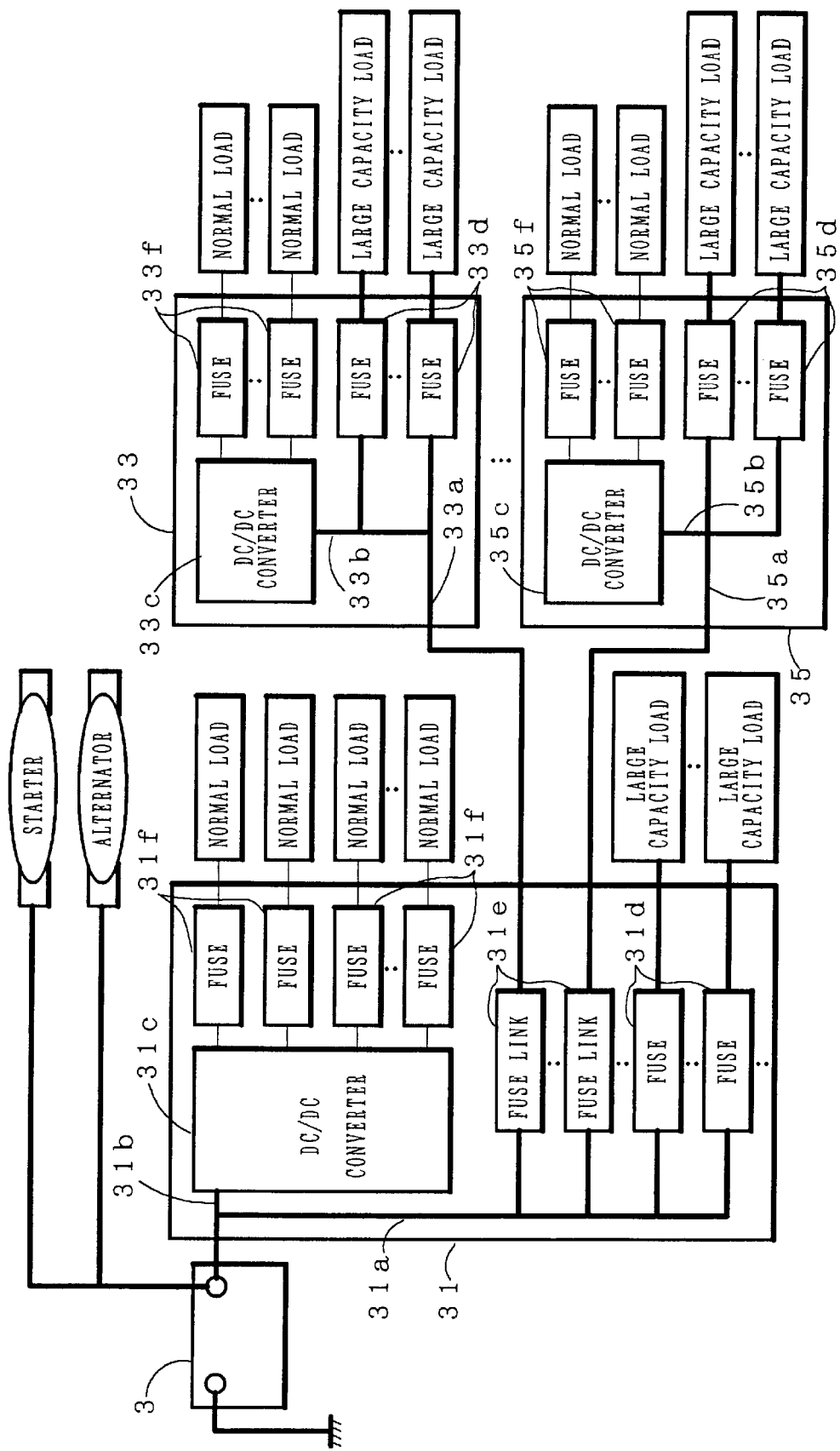
FIG. 2 is a block diagram showing a general configuration of an on-vehicle distribution system of an embodiment of the present invention.

As illustrated in FIG. 2 generally showing a block diagram of an on-vehicle distribution system of an embodiment of the present invention, the first distribution box 31 has a high-voltage circuit 31a and a branch circuit 31b. The high-voltage circuit 31a is 42 V in voltage to distribute an electrical power to a plurality of outputs. The branch circuit 31b is branched from the high-voltage circuit 31a at a point upstream from the distribution section for the plurality of outputs. The branch circuit 31b has a DC/DC converter 31 connected a first output terminal of the high-voltage circuit 31a. The DC/DC converter 31c converts the 42 V voltage supplied from the high-voltage circuit to 14 V for externally supplying the lowered voltage through a plurality of output terminals.

Some output lines of the high-voltage circuit 31a of the first distribution box 31 each include a fuse 31d of a high-voltage, and the other output lines each include a fusible link 31e. Meanwhile, each output line of the branch circuit 31b includes a fuse 31f of a low voltage.

The high-voltage circuit 31a of the first distribution box 31 is connected to the battery 3 at an input side (an upstream side) of the circuit 31a. Some output lines of the high-voltage circuits 31a each include a fuse 31d at the output side (a downstream side) thereof, and the output side is connected to large capacity loads such as the ignitor 11 or a door-trim window motor 23 provided near the assistant seat or near a rear seat just behind the assistant seat as illustrated in FIG. 1.

Each branch circuit 31b of the first distribution box 31 is connected to a normal load such as the head lamp 5 positioned in the assistant seat side and the room lamp 17 at the output side (a downstream side) of the circuit 31b as illustrated in FIG. 1.

The second and third distribution boxes 33, 35 each have the same configuration as the distribution box 31 except that there is no such high-voltage circuit as the high-voltage circuit 31a having the fusible link 31e. The second and third distribution boxes 33, 35 each have a high-voltage input side (an upstream side) connected to an output side (a downstream side) of the high-voltage circuit 31a having the fusible link 31e of the first distribution box 31.

The second distribution box 33 disposed near the driver seat has a plurality of output lines, each of which is provided with a fuse 33d of a high-voltage specification, of its high-voltage circuit 33a. Each high-voltage output line of the high-voltage circuit 33a is connected to a large capacity load such as the wiper motor 13 and door trim window motors 23, 23 mounted near the driver seat and near a rear seat just behind the driver seat as illustrated in FIG. 1. Each branch circuit 33b provided downstream from a DC/DC converter 33c of the second distribution box 33 has a fuse 33f of a low-voltage specification and has an output side (a downstream side) connected to a normal load such as a head lamp 5 positioned in the driver seat side, the horn 9, and the meters/accessories 15.

The third distribution box 35 disposed near the rear seat just behind the driver seat has a high-voltage circuit 35a consisting of a plurality of output lines each including a high-voltage fuse 35d. The output side (downstream side) of the fuse 35d is connected to a large capacity load such as a hot-wire defogger 21 for a rear window 19 as illustrated in FIG. 1. Furthermore, the third distribution box 35 has branch circuits 35b including a plurality of output lines each having a low-voltage fuse 35f and arranged downstream from a DC/DC converter 35c of the third distribution box. The output side (downstream side) of each output line of the branch circuit 35b is connected to a normal-voltage load such as the tail lamp 7.

In FIG. 2, denoted 37 is a cell motor and 39 an alternator, which are directly connected to the battery 3.

As described above, this embodiment includes the high-voltage circuits 31a, 33a, and 35a of the first to third distribution boxes 31, 33, and 35, which correspond to a primary circuit described in the invention summary. The fuses 31d, 33d, and 35d of the first to third distribution boxes 31, 33, and 35 correspond to a first fuse means described in the invention summary. The fuses 31f, 33f, and 35f of the first to third distribution boxes 31, 33, and 35 correspond to a second fuse means described in the invention summary.

In such configured distribution system of the embodiment, the large-capacity loads such as the ignitor 11, the wiper motor 13, the hot-wire defogger 21 for the rear window 19, and the window motors 23 are operated on the same voltage as the battery 3 of 42 V. Meanwhile, the normal-voltage loads such as the head lamp 5, the rear lamp 7, the horn 9, the meters/accessories 15, and the room lamp 17 are operated on 14 V which is lowered from 42 V by the DC/DC converters 31c, 33c, and 35c.

The first distribution box 31 disposed near the assistant seat supplies an electrical power of 14V or 42 V to normal-voltage and high-voltage loads arranged around the assistant seat such as the assistant seat side head lamp 5, the ignitor 11, the room lamp 17, and the window motors 23, 23 for the door trim near the assistant seat or near the rear seat just behind the assistant seat through the fuses 31d, 31f of the related specification.

Similarly, the second distribution box 33 disposed near the driver seat supplies an electrical power of 14 or 42 V to normal-voltage and high-voltage loads arranged around the driver seat such as the driver seat side head lamp 5, the horn 9, the wiper motor 13, the meters/accessories 15, and the door trim window motors 23, 23 near the driver seat or near the rear seat just behind the driver seat through the fuses 33d, 33f of the related specification.

Furthermore, the third distribution box 35 disposed near the rear seat just behind the driver seat supplies an electrical power of 14 or 42 V to normal-voltage and high-voltage loads arranged around the rear seat such as the tail lamp 7 and the hot-wire defogger 21 for the rear window 19 through the fuses 35d, 35f of the related specification.

By way of the first distribution box 31 directly connected to the is battery 3, a 42 V electrical power is supplied to the second and third distribution boxes 33, 35, but no 14 V electrical power which has been converted by the DC/DC converter is supplied to the second and third distribution boxes 33, 35. A 14 V electrical power supplied to the normal-voltage loads disposed around the driver seat and around the rear seat is provided through the DCIDC converters 33c, 35c arranged in the second and third distribution boxes 33, 35 positioned near the normal-voltage loads.

Hence, the on-vehicle distribution system of the embodiment can provide different kinds of electrical powers of 42 V voltage and 14 V voltage to a plurality of large capacity loads and normal capacity loads. The on-vehicle distribution system has the first to third distribution boxes 31, 33, and 35 each disposed near the assistant seat, the driver seat, and the rear seat just behind the driver seat so that each load may be connected to the nearest one of the first to third distribution boxes 31, 33, and 35. Through the first distribution box 31, a 42 V electrical power from the battery 3 is supplied to the second and third distribution boxes 33, 35, but no 14 V electrical power which has been converted by the DC/DC converter 31c is supplied to the second and third distribution boxes 33, 35.

Therefore, in the vehicle 1 having large capacity loads and normal-voltage loads, each load is provided with a corresponding voltage power efficiently reliably from a single battery 3 without a restriction, for example, caused by an ignition switch (not shown) condition.

Moreover, the capacities of the DC/DC converters 31c, 33c, and 35c of the first to third distribution boxes 31, 33, and, 35 for converting 42 V into 12 V each are designed to supply an electrical power just sufficient to only the normal-voltage loads arranged around each distribution box. This minimizes the DC/DC converters 31c, 33c, and 35c in size, allowing an easy mounting of them in the first to third distribution boxes 31, 33, and, 35. As a result, the first to third distribution boxes are mounted more easily in the vehicle 1.

Furthermore, a heat radiation caused by converting 42 V into 14 V is distributed within the DC/DC converters 31c, 33c, and 35c without a large amount of concentrated heat radiation, thereby eliminating an additional structure for heat radiation or for cooling.

In addition, the first distribution box 31 transfers an electrical power of 42 V supplied from the battery 3 to the second and third distribution boxes, reducing a transmission power loss as compared with a 14 V power transmission.

Furthermore, the normal-voltage loads mounted in the vehicle 1 are distributively arranged in the branch circuits 31b, 33b, and 35b disposed downstream from the DC/DC converters 31c, 33c, and 35c of the first to third distribution boxes 31, 33, and 35 with considering the position of each normal-voltage load for receiving an electrical power from the battery 3. Thus, if desired, one of the distribution boxes 31, 33, or 35. can stop an electric supply for the associated normal-voltage loads according to the state of the vehicle 1 or the state of each normal load.

Moreover, in the such configured distribution system of the embodiment, each branch circuit 31b, 33b, or 35b of each distribution box 31, 33, or 35 has each fuse 31f, 33f or 35f disposed downstream from each DC/DC converter 31c, 33c, or 35c. Thus, these fuses 31f, 33f, and 35f are not of a high-voltage specification but are of a normal-voltage specification, thereby allowing a reliable shutdown of each branch circuit 31b, 33b, or 35b in the event of an overcurrent of the related normal load.

It is noted that the embodiment is discussed not to limit the large capacity loads of 42V and the normal loads of 14 V in number and in specification. Furthermore, the 42 V voltage for large capacity loads and the 14 V voltage for normal loads may be otherwise selected In the embodiment, since the battery 3 is 42 V in voltage the same as the large capacity loads, through the first distribution box 31, a 42 V electrical power from the battery 3 is supplied to the second and third distribution boxes 33, 35. The DC/DC converter 31c, 33c, and 35c of the first to third distribution boxes 31, 33, 35 convert 42V into 14V.

However, when the vehicle has a battery of 14V equal to the capacity of the normal loads, the first to third distribution boxes 31, 33, 35 may have other DC/DC converters that increase 14 V into 42 V in place of the DC/DC converter 31c, 33c, and 35c. Thus, the normal loads may be provided with an electrical power not through the other DC/DC converters, while the large capacity loads may be supplied with an electrical power through the other DC/DC converters.

Note that the embodiment having the high-voltage battery 3 corresponding to the large capacity loads is preferable so that the first to third distribution boxes 31, 33, and 35 may be provided with the high-voltage power from the battery to reduce a power transmission loss.

What is claimed is:

1. An on-vehicle distribution box for distributing an electrical power supplied from a power source to a first voltage load operated on a first voltage and a second voltage load operated on a second voltage differed from said first voltage, the distribution box comprising:

a primary circuit of which an upstream point is connected to said power source and of which a downstream point is connected to said first load, a first fuse means provided in said primary circuit, a branch circuit branched upstream from said first fuse means from said primary circuit and connected to said second load at a downstream point of said branch circuit, a DC/DC converter arranged in said branch circuit for converting the first voltage to the second voltage, and a second fuse means arranged in said branch circuit downstream from said DC/DC converter.

2. The distribution box set forth in claim 1, wherein the first voltage is higher than the second voltage.

3. An on-vehicle distribution system comprising a main distribution box and a secondary distribution box each of which has the constitution of the distribution box set forth in claim 1 or 2, wherein an upstream point of said secondary distribution box is electrically connected to a downstream point of said primarily distribution box.

4. An on-vehicle distribution system comprising a main distribution box and at least two secondary distribution boxes, each of said primary and secondary distribution boxes having the constitution of said distribution box set forth in claim 2, said secondary distribution boxes being electrically connected to a downstream point of said primarily distribution box, wherein the main distribution box is positioned near an assistant seat, and the secondary distribution boxes are positioned near a driver seat and near a rear seat of the vehicle.

\* \* \* \* \*